Figure 1:
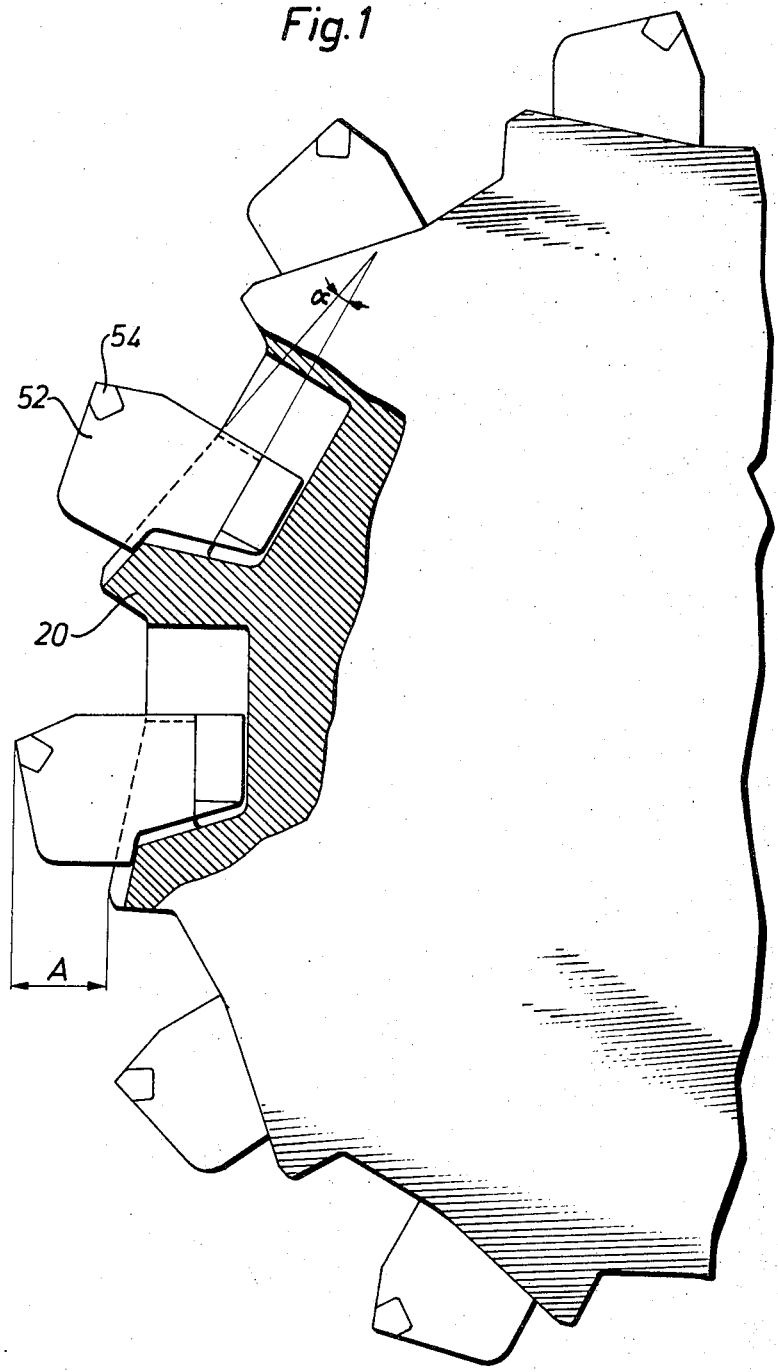

United States Patent [19]
Lundström et al.

[11] 3,820,849
[45] June 28, 1974

[54] CUTTING TIPS REMOVABLY SECURED IN MILLING CUTTER HEAD

[75] Inventors: Hans Per Olof Lundström; Bernt Soren Liljekvist, both of Sandviken, Sweden

[73] Assignee: Sandvik Aktiebolag, Sandviken, Sweden

[22] Filed: Jan. 22, 1973

[21] Appl. No.: 325,456

[30] Foreign Application Priority Data
Dec. 1, 1972   Great Britain..................... 55744/72

[52] U.S. Cl..................... 299/93, 299/89, 175/410, 175/413, 76/108 A, 29/105 R
[51] Int. Cl.......................................... E21c 35/18
[58] Field of Search................ 29/105 R, 105 A, 96; 76/108 A; 83/838, 839, 840; 175/410, 412, 413; 299/89, 91, 93

[56] References Cited
UNITED STATES PATENTS

| | | | |
|---|---|---|---|
| 975,468 | 11/1910 | Sessions............................ | 299/91 X |
| 1,468,914 | 9/1923 | Morgan............................. | 299/91 X |
| 2,905,456 | 9/1959 | Rafferty et al..................... | 299/89 X |
| 3,666,321 | 5/1972 | Lundström et al. ................. | 299/93 |

Primary Examiner—Leonidas Vlachos
Attorney, Agent, or Firm—Pierce, Scheffler & Parker

[57] ABSTRACT

A carbide cutting tip is mounted in a separate cartridge which is removably secured in a rotary milling cutter head, so that break-down of the tip will not endanger damage to the cutter head but only the cartridge.

2 Claims, 3 Drawing Figures

CUTTING TIPS REMOVABLY SECURED IN MILLING CUTTER HEAD

The present invention relates to a rock drilling machine of the kind wherein the drilling is performed by a milling cutter head which rotates simultaneously around its own axis and around an axis remote therefrom.

In machines of the aforesaid kind difficulties have been encountered in that when the carbide tips used for the drilling break down the tool holder is subjected to contact with the rock material and thereby is damaged.

In our U.S. Pat. No. 3,666,321 it was proposed that the carbide tips be mounted in cartridges, which cartridges were to be secured in replaceable shanks and these shanks, in turn, were to be secured in appropriate sockets in the milling cutter head. This construction does, in fact, serve to guard against inadvertent damage to the milling cutter head.

We have discovered, however, that the use of shanks for replaceably securing the carbide tip-containing cartridges in the milling cutter head may be avoided, and that the cartridges per se may be wedgingly secured directly in T-shaped slots or recesses provided in the milling cutter head.

A principal reason for the development of the present invention involving elminating the prior shank was the need for higher feeds of the milling cutter, and for that purpose the outer slim portion of the cartridge of the patent would have had to be prolonged. However, this could not be done on account of a smaller cutter head due to the fact that the driving means available for each said cutter head puts a lower limit on the dimension of said cutter head, and the stresses acting upon each cartridge and shank during rotation and cutting create an upper limit as to the length thereof which extends from the cutter head. Hence, there was no other possibility than to eliminate the shank and to secure the cartridge directly in the milling cutter head.

Figure 2:
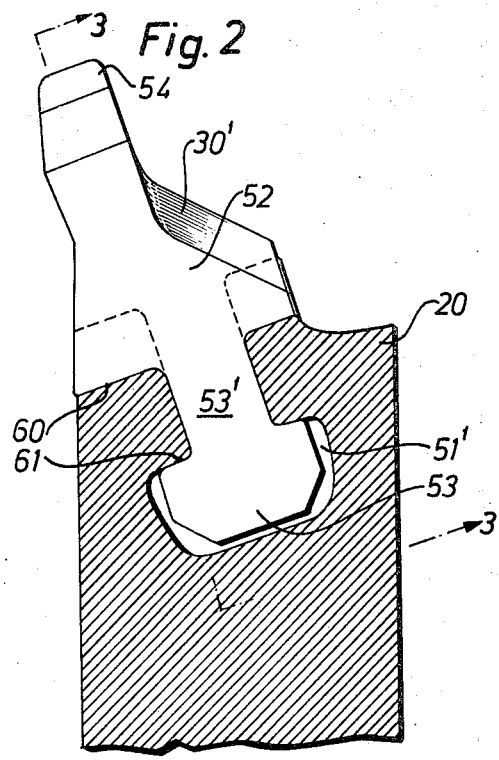
Figure 3:
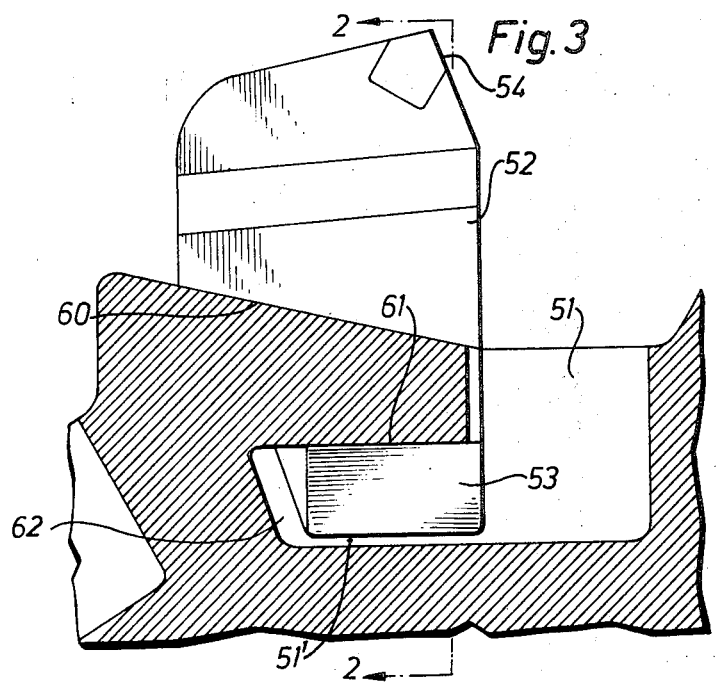

In the following more detailed description, we describe one form of the invention, the same being illustrated in the appended drawing, in which FIG. 1 is a partial view, endwise, of a milling cutter head, partly broken away, and diagrammatically showing the provision of an array of carbide insert-containing cartridges secured in T-shaped recesses provided about the periphery of the cutter head, the part broken away showing, in cross-section, the mode of attaching a cartridge to the cutter head;

FIG. 2 is a fragmentary view, taken on the line 2—2 of FIG. 3, showing the cutter head in section but the whole carbide-tipped cartridge secured thereto in side view; and FIG. 3 is a section taken along line 3—3 of FIG. 2, and showing (at somewhat larger scale) the cartridge appearing in cross-section in FIG. 1.

The entire cutting head is represented at 20 in FIG. 1. Shown in cross-section in this figure is one of an array of similar cutting inserts secured at spaced intervals about the periphery of the cutting head. Each cutting unit consists of a cartridge 52, equipped with a carbide insert 54. The cartridge is secured in a recess or slot 51 formed in the periphery of cutting head 20. A portion 51' of the recess 51 is T-shaped complimentary to cartridge 52.

As shown in FIG. 2, the cartridge 52 is elongated, and includes (a) an outer end portion terminating in carbide insert 54, (b) a T-shaped inner end portion 53 (received in portion 51' of slot 51), and (c) a constricted neck portion 53' between said end portions of the cartridge. A tapered surface 30' (see FIG. 2) on the cartridge functions as a breaking surface for uncut portions of workpiece.

Cartridge 52 is secured in slot 51 by reason of wedge surfaces 60 and 61 on the walls of the slot which wedge surfaces diverge in a downward direction to establish a suitable wedge form, so that the cartridge is carried solely by its wedging action between 60 and 61 and is spaced from the bottom of the slot 51 by the space 62. The T-slot connection is oriented in the same direction as the rotation of the cutter, so that the connection is pressed together by pressure on the cutting tip of the cartridge.

The angle $\alpha$ in FIG. 1 and FIG. 3 preferably should be 9° – 12°, so as to ensure firm grip of the cartridge in its slot or recess on the cutter head.

Carbide tip 54 shall protrude a distance A (see FIG. 1) at least equal to the feed per tooth of the milling cutter, and preferably 3 or 4 times that distance.

We claim:

1. A milling cutter for rock drilling which comprises:

a milling cutter head the periphery of which is provided with a plurality of recesses, each said recess terminating radially inwardly in a T-shaped enlargement with a closed base the mouth of which is narrowed by respective projections;

a plurality of cutter tool holders each having at one end portion a carbide tip insert and at its opposite end a T-shaped end portion removably secured in one of said recesses;

each said projection having opposed contact surfaces which converge in the direction from which the T-shaped end portion is mounted and which engage corresponding contact surfaces on said T-shaped end portion, the projections when placed under compression across their opposed surfaces wedgedly supporting said holder from the closed bases of said recesses on said cutter head.

2. A milling cutter as defined in claim 1, in which the opposed contact surfaces taper to provide a wedge angle of from about 9° to about 12°.

* * * * *